(12) United States Patent
Mier et al.

(10) Patent No.: US 8,165,714 B2
(45) Date of Patent: Apr. 24, 2012

(54) CONTROLLER FOR CONTROLLING COMBINATION OF HOT-RUNNER SYSTEM AND MOLD ASSEMBLY

(75) Inventors: Angelo Mier, Colchester, VT (US); Keith Carlton, Caledon, CA (US); David Scott Rotondo, Thousand Oaks, CA (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 294 days.

(21) Appl. No.: 12/692,916

(22) Filed: Jan. 25, 2010

(65) Prior Publication Data
US 2011/0184550 A1    Jul. 28, 2011

(51) Int. Cl.
*B29C 39/00* (2006.01)
(52) U.S. Cl. .................................. 700/197; 425/145
(58) Field of Classification Search .................. 700/197, 700/200
See application file for complete search history.

(56) References Cited

U.S. PATENT DOCUMENTS

| | | | |
|---|---|---|---|
| 5,795,511 A | 8/1998 | Kalantzis et al. | |
| 6,000,831 A | 12/1999 | Triplett | |
| 6,421,577 B1 | 7/2002 | Triplett | |
| 6,529,796 B1 | 3/2003 | Kroeger et al. | |
| 6,589,039 B1* | 7/2003 | Doughty et al. | 425/145 |
| 7,214,048 B2 | 5/2007 | Kim | |
| 7,258,536 B2 | 8/2007 | Olaru et al. | |
| 7,580,771 B2* | 8/2009 | Quail et al. | 700/197 |
| 2003/0154004 A1 | 8/2003 | Kroeger et al. | |
| 2006/0082009 A1* | 4/2006 | Quail et al. | 264/40.1 |
| 2008/0006955 A1* | 1/2008 | Niewels | 264/40.5 |
| 2008/0290541 A1 | 11/2008 | Baumann | |

FOREIGN PATENT DOCUMENTS

EP    0967063    6/1999

* cited by examiner

*Primary Examiner* — Albert DeCady
*Assistant Examiner* — Anthony Whittington

(57) ABSTRACT

A single stand alone controller system (100) for controlling combination of hot-runner system (102) and mold assembly (104), assembly (104) connectable to system (102), controller system (100) comprising: processor (110); interface modules (112) configured to operatively couple to system (102) and assembly (104), processor (110) connected with modules (112); and controller-usable medium (114) embodying instructions (116) executable by processor (110), processor (110) connected with said medium (114), instructions (116) including: executable instructions for directing said processor (110) to control said system (102) and said assembly (104).

7 Claims, 2 Drawing Sheets

CONTROLLER FOR CONTROLLING COMBINATION OF HOT-RUNNER SYSTEM AND MOLD ASSEMBLY

TECHNICAL FIELD

Figure 1:
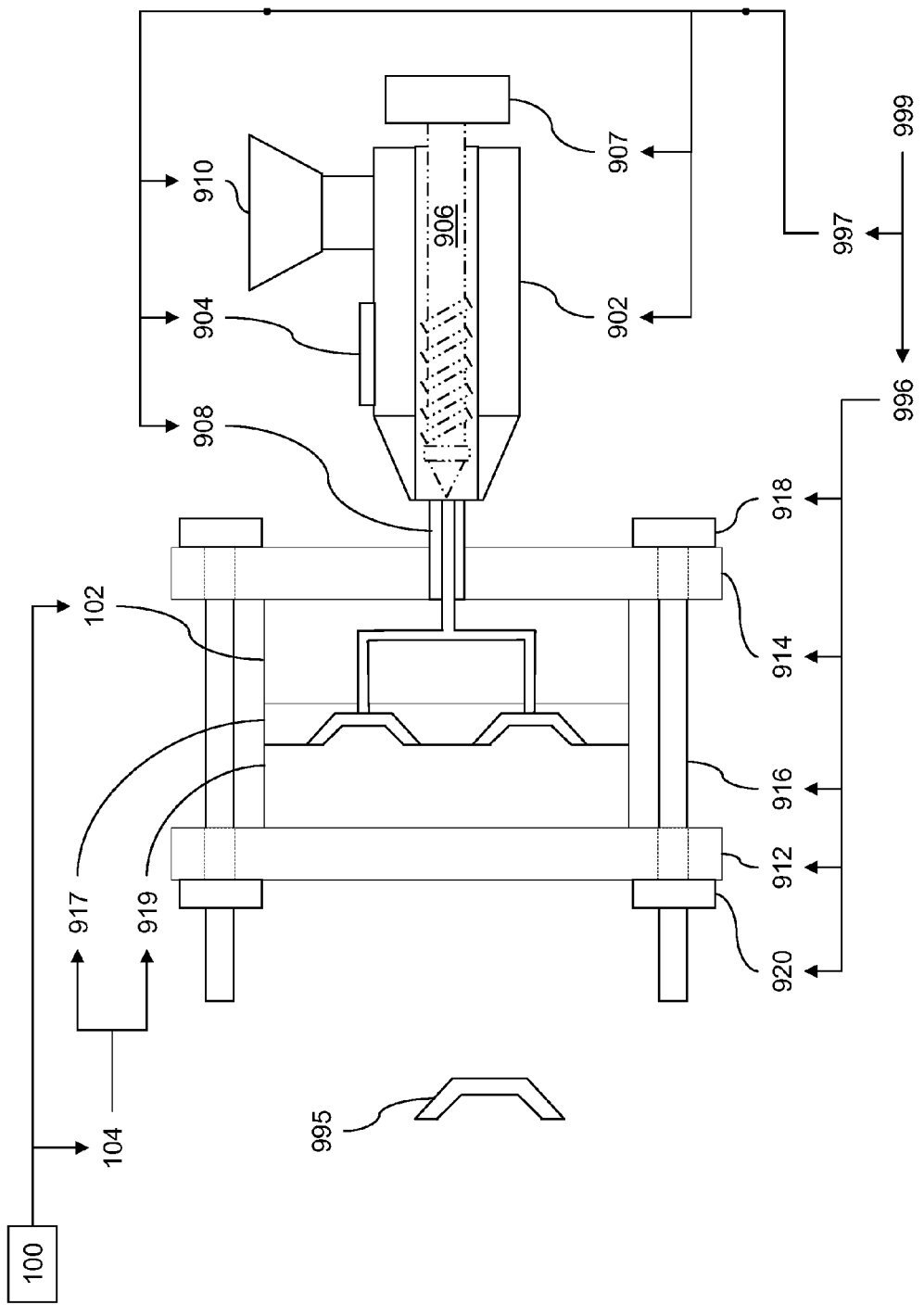

An aspect of the present invention generally relates to (but is not limited to) a controller for molding systems including (but not limited to) a controller for controlling a combination of a hot-runner system and a mold assembly.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than 5 tons to 6000 tons, with the higher figures used in comparatively few manufacturing operations. The total clamp force needed is determined by the projected area of the part being molded. This projected area is multiplied by a clamp force of from 2 to 8 tons for each square inch of the projected areas. As a rule of thumb, 4 or 5 tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled.

Mold assembly or die are terms used to describe the tooling used to produce plastic parts in molding. The mold assembly are used in mass production where thousands of parts are produced. Molds are typically constructed from hardened steel, etc.

U.S. Pat. No. 5,795,511 (Inventor: KALANTZIS, et al.; Filed: 6 Jun. 1995) discloses an apparatus and method for providing material to a mold, such as in an injection molding system, wherein the settings for controlling the molding operation are retained in a non-volatile memory in a hot-half of the mold.

European patent Number 0967063 (Inventor: Moss et al.; Filed: 24 Jun. 1999) discloses a pressure transducer used to sense the pressure in the manifold bore downstream of the valve pin head.

U.S. Pat. No. 6,000,831 (Inventor: TRIPLETT; Filed: 14 Dec. 1999) discloses injection mold hot runner control devices and more particularly to an injection molding control device which eliminates the conventional control cables to improve the quality of feedback signals received by the controller and the safety of the environment in which such systems are used.

U.S. Pat. No. 6,529,796 (Inventor: Kroeger, et al.; Filed: 21 Jul. 1999) discloses an injection mold apparatus having multiple injection zones, each zone having at least one heater and at least one temperature sensor generating a temperature indicating signal.

U.S. Pat. No. 6,421,577 (Inventor: TRIPLETT; Filed: 15 Oct. 1999) discloses injection mold hot runner control devices and more particularly to an injection molding control device which eliminates the conventional control cables to improve the quality of feedback signals received by the controller and the safety of the environment in which such systems are used.

U.S. Pat. No. 6,589,039 (Inventor: DOUGHTY et al.; Filed: 2000-10-30) discloses a system and method in which the rate of material flow to a plurality of gates can be controlled by a single controller.

United States Patent Publication Number 20030154004 (Inventor: KROEGER, et al.; Filed: 23 Jan. 2003) discloses an injection mold apparatus having multiple injection zones, each zone having at least one heater and at least one temperature sensor generating a temperature indicating signal.

U.S. Pat. No. 7,214,048 (Inventor: KIM; Filed: 25 May 2004) discloses control for a valve pin through a linear motor controlled by a pulse signal and through a cooling block, so that an opening/closing amount of a gate can be precisely managed.

U.S. Pat. No. 7,258,536 (Inventor: OLARU, et al.; Filed: 21 Jun. 2004) discloses a control module attached to a machine platen of an injection molding machine. The control module is coupled to at least one sensor that reports a value of a processing condition associated with an injection mold and is disposed within the injection mold. The control module is also coupled to at least one controllable device that varies the processing condition of the injection mold and is disposed within the injection mold. The control module collects and processes sensor output, and provides a control signal to at least one controllable device. A display interface module is linked to the control module. The display interface module accepts user-entered data set-points, provides the user-entered data set-points to the control module, and collects the processed sensor output from the control module for display to a user.

United States Patent Publication Number 20060082009 (Inventor: Quail, et al; Filed: 19 Oct. 2004) discloses an intelligent molding system that makes use of data directly associated with a molding environment or particular mold.

United States Patent Publication Number 2008/0290541 (Inventor: BAUMANN; Filed: 25 May 2007) discloses an injection molding system including a hot runner comprising a memory device configured to contain at least one process control parameter.

United States Patent Publication Number 2008/0006955 (Inventor: NIEWELS; filed: 5 Jul. 2007) discloses a piezoceramic actuator actuated so as to supply the force to seal the side acting core insert against the core insert during a molding operation. Sensors are used to detect pressure between mold components and to transmit sense signals to a controller.

SUMMARY

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood that "comprising" means "including but not limited to the following".

According to one aspect, there is provided a single stand alone controller system (100) for controlling a combination of a hot-runner system (102) and a mold assembly (104), the mold assembly (104) being connectable to the hot-runner system (102), the single stand alone controller system (100) comprising: a processor (110); interface modules (112) being configured to operatively couple to the hot-runner system (102) and the mold assembly (104), the processor (110) being connected with the interface modules (112); and a controller-usable medium (114) embodying instructions (116) being executable by the processor (110), the processor (110) being connected with the controller-usable medium (114), the instructions (116) including: executable instructions for directing the processor (110) to control the hot-runner system (102) and the mold assembly (104).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

Figure 2:
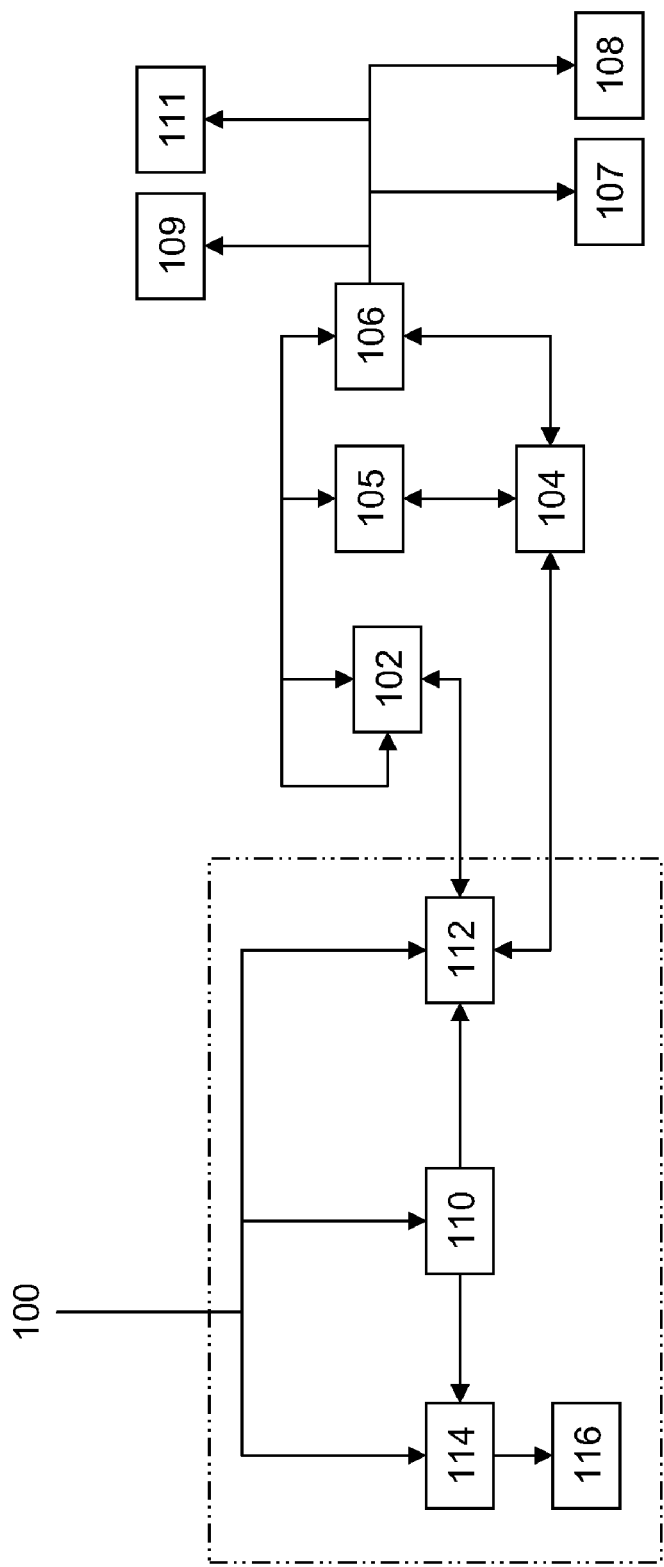

The non-limiting embodiments will be more fully appreciated by reference to the following detailed description of the non-limiting embodiments when taken in conjunction with the accompanying drawings, in which:

FIG. 1 depicts a schematic representation of the single stand alone controller system (100); and FIG. 2 depicts another schematic representation of the single stand alone controller system (100).

The drawings are not necessarily to scale and may be illustrated by phantom lines, diagrammatic representations and fragmentary views. In certain instances, details not is necessary for an understanding of the embodiments (and/or details that render other details difficult to perceive) may have been omitted.

DETAILED DESCRIPTION OF THE
NON-LIMITING EMBODIMENT(S)

The single stand alone controller system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9).

FIG. 1 depicts the schematic representation of the single stand alone controller system (100). The single stand alone controller system (100) may be hereafter referred, from time to time, as the "controller system (100)". An injection molding system (999) is depicted as having the single stand alone controller system (100). The injection molding system (999) includes (but is not limited to): an extruder assembly (997) and a clamping assembly (996). The extruder assembly (997), which is also called an injection unit, includes (but is not limited to): a barrel assembly (902), a heater assembly (904), a screw assembly (906), a drive assembly (907) for driving the screw assembly (906), a machine nozzle (908) connected to an exit end of the barrel assembly (902), and a hopper (910) connected to an entrance end of the barrel assembly (902). The clamping assembly (996) includes (but is not limited to): a movable platen (912), a stationary platen (914), tie bars (916), clamp units (918), lock units (920). A machine controller (not depicted, but known) is connected to the components of the injection molding system (999). The injection molding system (999), also known as an injection press, is a machine for manufacturing plastic products by the injection molding process. The injection molding system (999) can fasten the mold assembly (104) in either a horizontal or vertical position. Usually, the mold assembly (104) is horizontally oriented. Vertical orientation of the mold assembly (104) is used in some niche applications such as insert molding, allowing the machine to take advantage of gravity.

FIG. 2 depicts another schematic representation of the single stand alone controller system (100). The single stand alone controller system (100) is used for controlling a combination of a hot-runner system (102) and a mold assembly (104). The mold assembly (104) is connectable to the hot-runner system (102). The single stand alone controller system (100) includes (but is not limited to): (i) a processor (110); (ii) interface modules (112), and (iii) a controller-usable medium (114).

The processor (110) may be referred to as a central processing unit (CPU), which is an electronic circuit that can execute computer programs. The CPU or processor is the portion of a computer system that carries out the instructions of a computer program, and is the primary element carrying out the computer's functions. This term has been in use in the computer industry at least since the early 1960s. The form, design and implementation of CPUs have changed since the earliest examples, but their fundamental operation remains much the same. The fundamental operation of most CPUs, regardless of the physical form they take, is to execute a sequence of stored instructions called a program. The program is represented by a series of numbers that are kept in some kind of computer memory. There are four steps that nearly all CPUs use in their operation: fetch, decode, execute, and writeback. The first step, fetch, involves retrieving an instruction (which is represented by a number or sequence of numbers) from program memory. The location in program memory is determined by a program counter (PC), which stores a number that identifies the current position in the program. In other words, the program counter keeps track of the CPU's place in the current program. After an instruction is fetched, the PC is incremented by the length of the instruction word in terms of memory units. Often the instruction to be fetched must be retrieved from relatively slow memory, causing the CPU to stall while waiting for the instruction to be returned. This issue is largely addressed in modern processors by caches and pipeline architectures (see below). The instruction that the CPU fetches from memory is used to determine what the CPU is to do. In the decode step, the instruction is broken up into parts that have significance to other portions of the CPU. The way in which the numerical instruction value is interpreted is defined by the CPU's instruction set architecture (ISA). Often, one group of numbers in the instruction, called the opcode, indicates which operation to perform. The remaining parts of the number usually provide information required for that instruction, such as operands for an addition operation. Such operands may be given as a constant value (called an immediate value), or as a place to locate a value: a register or a memory address, as determined by some addressing mode. In older designs the portions of the CPU responsible for instruction decoding were unchangeable hardware devices. However, is in more abstract and complicated CPUs and ISAs, a microprogram is often used to assist in translating instructions into various configuration signals for the CPU. This microprogram is sometimes rewritable so that it can be modified to change the way the CPU decodes instructions even after it has been manufactured.

After the fetch and decode steps, the execute step is performed. During this step, various portions of the CPU are connected so they can perform the desired operation. If, for instance, an addition operation was requested, an arithmetic logic unit (ALU) will be connected to a set of inputs and a set of outputs. The inputs provide the numbers to be added, and the outputs will contain the final sum. The ALU contains the circuitry to perform simple arithmetic and logical operations on the inputs (like addition and bitwise operations). If the addition operation produces a result too large for the CPU to handle, an arithmetic overflow flag in a flags register may also be set.

The final step, writeback, simply "writes back" the results of the execute step to some form of memory. Very often the results are written to some internal CPU register for quick access by subsequent instructions. In other cases results may be written to slower, but cheaper and larger, main memory. Some types of instructions manipulate the program counter rather than directly produce result data. These are generally called "jumps" and facilitate behavior like loops, conditional program execution (through the use of a conditional jump), and functions in programs. Many instructions will also change the state of digits in a "flags" register. These flags can be used to influence how a program behaves, since they often indicate the outcome of various operations. For example, one type of "compare" instruction considers two values and sets a number in the flags register according to which one is greater. This flag could then be used by a later jump instruction to determine program flow. After the execution of the instruction and writeback of the resulting data, the entire process repeats, with the next instruction cycle normally fetching the next-in-sequence instruction because of the incremented value in the program counter. If the completed instruction was a jump, the program counter will be modified to contain the address of the instruction that was jumped to, and program execution continues normally. In more complex CPUs than the one described here, multiple instructions can be fetched, decoded, and executed simultaneously. This section describes what is generally referred to as the "Classic RISC pipeline," which in fact is quite common among the simple CPUs used in many electronic devices (often called microcontroller). It largely ignores the important role of CPU cache, and therefore the is access stage of the pipeline.

The interface modules (112) are configured to operatively couple to the hot-runner system (102) and couple to the mold assembly (104). The processor (110) is connected with the interface modules (112). The interface modules (112) are connections between different elements of the controller system (100) and elements that exist outside of the controller system (100). The interface modules (112) are also called electrical connectors (for example), which are a conductive device for joining electrical circuits together. The connection may be temporary, as for portable equipment, or may require a tool for assembly and removal, or may be a permanent electrical joint between two wires or devices. There are hundreds of types of electrical connectors. In computing, an electrical connector can also be known as a physical interface (compare Physical Layer in OSI model of networking). Connectors may join two lengths of flexible wire or cable, or may connect a wire or cable to an electrical terminal.

The controller-usable medium (114) embodies a grouping of instructions (116), hereafter referred to as the "instructions (116)", which are executable by the processor (110). The processor (110) is connected with the controller-usable medium (114). The controller-usable medium (114) is a material on which data are recorded, such as, but not limited to: CD-RWs (compact discs), DVDs (digital video disk), external hard drives, magnetic tape, etc.

In computing, an executable file, such as instructions (116), causes the controller system (100) to perform indicated tasks according to encoded instructions, as opposed to a file that only contains data. Files that contain instructions for an interpreter or CPU or virtual machine may be considered executables, but are more specifically called scripts or bytecode. Executables are also called "binaries" in contrast to the program's source code. In computer science, source code (commonly just source or code) is any collection of statements or declarations written in some human-readable computer programming language. Source code is the mechanism most often used by programmers to specify the actions to be performed by a computer. The source code which constitutes a program is usually held in one or more text files, sometimes stored in databases as stored procedures and may also appear as code snippets printed in books or other media. A large collection of source code files may be organized into a directory tree, in which case it may also be known as a source tree. A computer program's source code is the collection is of files needed to convert from human-readable form to some kind of computer-executable form. The source code may be converted into an executable file by a compiler, or executed on the fly from the human readable form with the aid of an interpreter. The code base of a programming project is the larger collection of all the source code of all the computer programs which make up the project. The instructions (116) include (but are not limited to) executable instructions for directing the processor (110) to control the hot-runner system (102) and the mold assembly (104). More specifically, the instructions (116) include (but are not limited to) executable instructions for directing the processor (110) to control: (i) a set of thermal-management devices (105), and (ii) a group of electrically-actuated devices (106). The set of thermal-management devices (105) is mounted to the hot-runner system (102) and is also mounted to the mold assembly (104). The group of electrically-actuated devices (106) is mounted to the hot-runner system (102) and is also mounted to the mold assembly (104). It will be appreciated that the set of thermal-management devices (105) may include (but is not limited to: (i) a set of heaters (known but not depicted), (ii) a set of cooling devices (known but not depicted) with cooling conduits with associated cooling support structures and cooling fluid, etc, or the combination of (i) and (ii).

According to a variation of the single stand alone controller system (100), the group of electrically-actuated devices (106)

includes a collection of hot-runner valve stems (107). The hot-runner valve stems (107) may be either individually actuated or plate actuated.

The instructions (116) further include additional (or more) executable instructions for directing the processor (110) to control the collection of hot-runner valve stems (107).

According to another variation of the single stand alone controller system (100), the group of electrically-actuated devices (106) includes moving-mold components (108). Examples of the moving-mold components (108) include (but are not limited to): core pulls, and/or slides, etc. The instructions (116) further include additional executable instructions for directing the processor (110) to control the moving-mold components (108).

According to yet another variation of the single stand alone controller system (100), the group of electrically-actuated devices (106) includes molded-part ejection components (109). Examples of the molded-part ejection components (109) include (but are not limited to): ejector pins, and/or stripper plates, etc. The instructions (116) further include additional executable instructions for directing the processor (110) to control the molded-part ejection components (109).

According to a yet again variation of the single stand alone controller system (100), the group of electrically-actuated devices (106) include molded-part removal components (111). An example of the molded-part removal components (111) includes (but is not limited to): swing chutes, etc. The instructions (116) further include additional executable instructions for directing the processor (110) to control the molded-part removal components (111).

The technical effect of the controller system (100) is by controlling all electrified functions (such as, heating zones, motorized and/or solenoid valve stem control, core pull control, ejector control, swing chute control, etc) of the combination of the hot-runner system (102) and the mold assembly (104) from the controller system (100), the cost, required floor space, and complexity are minimized while maximizing potential performance and efficiency.

The electrically-actuated devices (106) each require some form of controller in addition to a standard temperature controller (known but not depicted) used for the hot-runner system (102). Advantageously, the controller system (100) combines the known individual controllers (not depicted) with the known temperature controller (not depicted) into the controller system (100) with one centralized processor/control point. The controller system (100) can be treated as one single integrated master system controller.

Electrically-actuated devices (106) used in the combination of the hot-runner system (102) and the mold assembly (104) each require some form of controller in addition to the standard temperature controller used for the hot-runner system (102). This arrangement of the known art negatively impacts the end user as the known arrangement occupies valuable extra floor space, requires costly and inconvenient multiple supply power feeds, has multiple locations for the operator to make process adjustments, and the various controllers often do not interface with each other in a practical manner which allows for situations resulting in equipment damage (e.g., actuating hot runner valve stems when the temperature controller is off or the Hot Runner is cold) or poor overall molding system performance.

The controller system (100) combines the functions of the individual known controllers (not depicted) with a known temperature controller (not depicted) into one integrated single stand alone controller system (100), so that the end user only needs the one piece of control equipment on the shop floor, one supply power feed, one location for the operator to make process adjustments, and all of the ideal interfaces/interlocks to prevent any equipment damage and ensure optimum system performance.

The controller system (100) provides a single piece of auxiliary equipment that will control hot-runner system temperatures as well as any or all electrically actuated devices and/or axis on the combination of the hot-runner system (102) and the mold assembly (104). Examples of these additional devices include, but are not limited to, electrically actuated or motorized valve stem (or stems), electrically actuated or motorized core pulls, and electrically actuated or motorized ejector/stripper pins/plates, each of which require some sort of controller. The controller system (100) would take the hardware components, methods, and software (or similar capable of performing the same control function) typically used for each of these controllers and incorporate them together into one piece of equipment for control of the entire system. As an example, the controller system (100) integrates control of a servo-motor driven valve stem plate and a core pull actuator with a temperature control. The servo drive, line filter, relays, DC power supply, fuses/circuit breakers, wiring, etc, used to control the servo motor would be assembled together with the components that make up a temperature controller (solid state switching devices, thermocouple monitoring devices, central processor and its required components, operator interface device, etc) into the controller system (100). The controller system (100) contains the necessary software/firmware to be able to control both the set of thermal-management devices (105) of the hot-runner system and the valve stem motor positioning, and this arrangement ensures (or interlocks) the operation of the valve stem motor to occur only when it is appropriate to do so (that is, when the hot-runner system (102) is at the required temperature) thus preventing potential equipment damage (valve stem damage from pushing against solidified resin) and optimizing performance.

It is noted that the foregoing has outlined the non-limiting embodiments. Thus, although the description is made for particular non-limiting embodiments, the scope of the present invention is suitable and applicable to other arrangements and applications. Modifications to the non-limiting embodiments can be effected without departing from the scope the independent claims. It is understood that the non-limiting embodiments are merely is illustrative.

What is claimed is:

1. A single stand alone controller system (100) for controlling a combination of a hot-runner system (102) and a mold assembly (104), the mold assembly (104) being connectable to the hot-runner system (102), the single stand alone controller system (100) comprising:
   a processor (110);
   Interface modules (112) being configured to operatively couple to the hot-runner system (102) and the mold assembly (104), the processor (110) being connected with the interface modules (112); and
   a controller-usable medium (114) embodying a grouping of instructions (116) being executable by the processor (110), the processor (110) being connected with the controller-usable medium (114), the grouping of instructions (116) including:
      executable instructions for directing the processor (110) to control the hot-runner system (102) and the mold assembly (104)
wherein:
   the grouping of instructions (116) further includes:
      additional executable instructions for directing the processor (110) to control:

a set of thermal-management devices (105) being mounted to the hot-runner system (102) and being mounted to the mold assembly (104); and a group of electrically-actuated devices (106) being mounted to the hot-runner system (102) and being mounted to the mold assembly (104).

2. The single stand alone controller system (100) of claim 1, wherein:

the group of electrically-actuated devices (106) includes a collection of hot-runner valve stems (107); and the grouping of instructions (116) further include more executable instructions for directing the processor (110) to control the collection of hot-runner valve stems (107).

3. The single stand alone controller system (100) of claim 1, wherein:

the group of electrically-actuated devices (106) includes moving-mold components (108); and the grouping of instructions (116) further includes more executable instructions for directing the processor (110) to control the moving-mold components (108).

4. The single stand alone controller system (100) of claim 1, wherein:

the group of electrically-actuated devices (106) includes molded-part ejection components (109); and the grouping of instructions (116) further includes more executable instructions for directing the processor (110) to control the molded-part ejection components (109).

5. The single stand alone controller system (100) of claim 1, wherein:

the group of electrically-actuated devices (106) includes molded-part removal components (111); and the grouping of instructions (116) further includes more executable instructions for directing the processor (110) to control the molded-part removal components (111).

6. The single stand alone controller system (100) of claim 1, wherein:

the group of electrically-actuated devices (106) includes a collection of hot-runner valve stems (107);

the grouping of instructions (116) further includes the additional executable instructions for directing the processor (110) to control the collection of hot-runner valve stems (107);

the group of electrically-actuated devices (106) includes moving-mold components (108);

the grouping of instructions (116) further includes the additional executable instructions for directing the processor (110) to control the moving-mold components (108);

the group of electrically-actuated devices (106) includes molded-part ejection components (109);

the grouping of instructions (116) further includes the additional executable instructions for directing the processor (110) to control the molded-part ejection components (109);

the group of electrically-actuated devices (106) includes molded-part removal components (111); and the grouping of instructions (116) further includes the additional executable instructions for directing the processor (110) to control the molded-part removal components (111).

7. An injection molding system (999) having the single stand alone controller system (100) of any one of claims 1 and 2 to 6.

\* \* \* \* \*